United States Patent Office 2,780,618
Patented Feb. 5, 1957

2,780,618

DISAZO DYESTUFFS AND COMPLEX HEAVY METAL COMPOUNDS THEREOF

Hans Ackermann, Riehen, near Basel, and Guido Schetty, Basel, Switzerland, assignors to J. R. Geigy A. G., Basel, Switzerland, a Swiss firm No Drawing. Application September 2, 1954, Serial No. 453,946

Claims priority, application Switzerland September 18, 1953

7 Claims. (Cl. 260—147)

The present invention concerns the production of a new class of metallisable disazo dyestuffs and the complex heavy metal compounds thereof. It also concerns a process for the dyeing of laquers or of protein substances such as leather or hairs, chiefly however, for the dyeing of natural or synthetic polypeptide fibres such as wool, silk, casein, superpolyamide and superpolyurethane fibres with the aid of the new disazo dyestuffs, in particular the complex heavy metal compounds thereof. Finally it concerns the products which are dyed by the use of the new disazo dyestuffs and their complex heavy metal compounds.

It has been found that a new class of metallisable disazo dyestuffs which can be converted advantageously into the complex heavy metal compounds is obtained by coupling a diazonium compound of the general Formula I

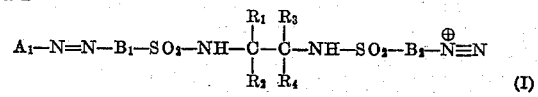

with an azo component usual in azo dyestuffs coupling in the neighbouring position to a hydroxyl group. In this Formula I: $A_1$ represents a component usual in azo dyestuffs which contains a hydroxyl group in the neighbouring position to the azo linkage, $B_1$ and $B_2$ represent radicals of the benzene series containing the azo linkage in the o-position to the bridging member of both rings, and $R_1$ to $R_4$ represent hydrogen, alkyl groups or constituents of organic ring systems. All aromatic rings can contain the further substituents usual in azo dyestuffs, that is, for example, halogen, alkyl, alkoxy, nitro, acylamino, carboxyl, sulphonic acid, sulphonic acid amide groups, sulphonic acid amide groups organically substituted at the nitrogen atom, alkyl, aralkyl or arylsulphonyl groups.

Of the technical possibilities of producing the diazonium compounds according to this invention, only a few are taken and more closely described in the following:

(a) An o-nitrophenyl sulphonic acid halide can be reacted with a monoacyl-α-β-diaminoalkane or cycloalkane or phenylene diamine compound, e. g. an o-nitrobenzene sulphonic acid chloride which can contain halogen, alkyl, alkoxy, nitro- or alkyl sulphonyl substituents in the benzene ring, is reacted with monoacetyl ethylene diamine in the presence of acid binding agents. If then the nitro group is reduced to the amino group and the acylamino group is saponified, then on reacting a further molecule of an aromatic o-nitrosulphonic acid halide compound, an α-o-nitrophenyl sulphonyl-amido-β-o-aminophenyl sulphonyl amidoalkane or cycloalkane is produced. For example, α-o-nitrobenzene sulphonyl-β-o-aminobenzene sulphonyl ethylene diamine can be produced according to this method. These nitro-amino compounds can either be diazotised and coupled with an azo component coupling in the neighbouring position to a hydroxyl group and then the nitro group reduced to the amino group and the latter diazotised or these nitro-amino compounds can first be acetylated and the nitro group reduced to the amino group, diazotised, coupled with an azo component coupling in a neighbouring position to a hydroxyl group and the acetylamino group saponified and then diazotised. In this way, diazo compounds of the general Formula I are obtained which are particularly well suited for the production of unsymmetrical disazo dyestuffs.

(b) Also α.β-diaminoalkanes or cycloalkanes or o-phenylene diamines can be diacylated with 2 mols of an o-nitrophenyl sulphonic acid halide, the nitro groups reduced to amino groups and tetrazotised, and then the reaction is performed in steps beginning with the coupling of one mol of an azo component coupling in the neighbouring position to a hydroxyl group. In this manner diazo compounds of the general Formula I are also obtained.

The last method described above is suitable particularly for the production of symmetrical disazo dyestuffs according to the present invention. Naturally, the reaction need not be performed in steps.

In the process according to the present invention, azo components usual in azo dyestuffs which couple in the neighbouring position to a hydroxyl group are the known compounds which couple in the neighbouring position to an enolic or phenolic hydroxyl group; e. g. 5-pyrazolones, dihydroxyquinolines, phenols, naphthols. These compounds can contain the further substituents usual in azo dyestuffs, e. g. halogen, alkyl, alkoxy, nitro, acylamino, alkyl-, dialkyl-, or phenylamino groups and in particular also sulphonic acid groups, sulphonic acid amide groups, sulphonic acid amide groups organically substituted at the nitrogen atom, or alkyl sulphonyl groups.

The disazo dyestuffs according to the present invention obtained according to the processes described, correspond to the general Formula II:

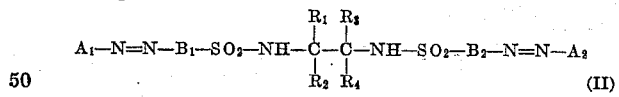

wherein the symbols $A_1$, $B_1$, $B_2$, $R_1$–$R_4$ have the meanings given in Formula I and $A_2$ represents an azo component coupled in the neghbouring position to an enolic or phenolic hydroxyl group.

In the process according to the present invention the components are so chosen with regard to the intended use that the disazo dyestuffffs or the complex heavy metal compounds thereof are of a suitable solubility. In heavy metal containing disazo dyestuffs which are soluble in lacquers, it is of advantage, for example, to avoid the presence of acid water solubilising groups, such as, e. g. sulphonic acid or carboxylic acid groups. For the production of heavy metal containing disazo dyestuffs which draw on to keratine fibres from a neutral to weakly acid medium the components are also so chosen that no acid water solubilising groups are present but care is taken that the end product contains substituents having a favourable effect on the water solubility.

As such, sulphonic acid amide groups, sulphonic acid amide groups organically substituted at the nitrogen atom, low molecular alkylsulphonyl and acylamino groups can be used. To produce disazo dyestuffs according to the present invention, if desired containing heavy metal, which dyestuffs draw from an acid bath, the components are so chosen that the end products contain at least one sulphonic acid group.

The disazo dyestuffs according to the present invention can be metallised by methods known per se either on the fibre or advantageously, in substance. Preferably the inorganic, organic or complex salts of trivalent chromium as well as those of cobalt can be used as agents yielding heavy metal. The metallisation can be performed in aqueous or organic solution or suspension, e. g. in the presence of lower alcohols, hydroxyalkyl ethers, ethers forming a ring such as dioxanes, carboxylic acid amides such as dimethyl formamide or acetamide. It may be performed either open or under pressure at a raised temperature. The avoidance of a strongly mineral acid reaction in the metallising agent is advantageous. The agents yielding heavy metal are used with advantage in such amounts that there is at least one heavy metal atom to a dyestuff molecule.

The disazo dyestuffs according to the present invention are obtained in the form of yellow, brown or dark powders according to the composition and, on keratine material, they produce yellow, yellow-brown, brown-red, brown, violet-brown to olive heavy metal dyeings which are distinguished particularly by good fastness to light.

The following examples illustrate the invention without limiting it in any way. Where not otherwise stated, the parts are given as parts by weight and the temperatures are in degrees centigrade. The relationship of parts by weight to parts by volume is as that of kilogrammes to litres.

EXAMPLE 1

37 parts of bis-(2-aminobenzene sulphonic acid)-ethylene diamide are dissolved hot in 400 parts of glacial acetic acid and 58 parts of concentrated hydrochloric acid are added. 14 parts of sodium nitrite, as a concentrated solution, are added dropwise at 15–20° and the whole is left to diazotise completely for 1 hour. The tetrazonium solution is mixed with a solution of 29.7 parts of β-naphthol in 100 parts of glacial acetic acid and 56 parts of sodium acetate are added while stirring. The dyestuff, which corresponds to the formula

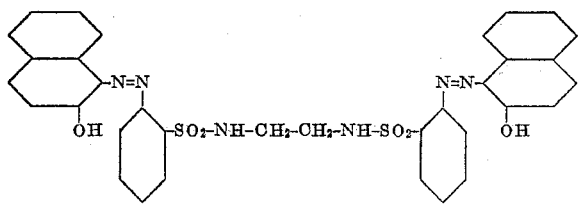

precipitates in the form of scarlet red crystals which can be drawn off under suction and washed. The disazo dyestuff is pasted in 750 parts of ethylene glycol and concentrated caustic soda lye is added until a complete solution is obtained and a sample diluted with water has a weakly alkaline reaction to mimosa paper. 32 parts of chromic acetate (corresponding to 9.1 parts of $Cr_2O_3$) are added and the whole is heated while stirring at 120–130° until the original dyestuff has disappeared. The red-brown solution is poured onto a sodium chloride solution and the chromium containing dyestuff which precipitates is filtered off. It is a brown powder which dissolves well in hot water and dyes wool from a weakly acid bath in red-brown shades which have excellent fastness to light. The solution in nitrocellulose lacquer is also red-brown.

A similar dyestuff is obtained if instead of 37 parts of bis-(2-aminobenzene sulphonic acid)-ethylene diamide, 39.8 parts of bis-(2-aminobenzene sulphonic acid)-α.β-dimethyl ethylene diamide, 38.4 parts of bis-(2-aminobenzene-sulphonic acid)-α-methyl ethylene diamide or 39.8 parts of bis-(2-aminobenzene sulphonic acid)-α.α-dimethyl ethylene diamide are used.

EXAMPLE 2

43.9 parts of bis-(2-amino-4-chlorobenzene sulphonic acid)-ethylene diamide are tetrazotised as described in Example 1, mixed with a solution of 47 parts of 2-naphthol-6-sulphonic acid in 100 parts of glacial acetic acid and the whole is added to 56 parts of sodium acetate. On completion of the coupling, the dyestuff is precipitated by diluting with water. The dyestuff is dissolved in 750 parts of water with caustic soda lye to give an alkaline reaction to mimosa paper, 260 parts by volume of a solution of ammonium chromosalicylate, corresponding to 9.2 parts of $Cr_2O_3$ are added, and the whole is boiled under reflux for 10 hours. The complex chromium compound is precipitated by the addition of sodium chloride. It is a brown powder which dyes wool from a sulphuric acid bath in fast to light red-brown shades.

A similar dyestuff is obtained if instead of 43.9 parts of bis-(2-amino-4-chlorobenzene sulphonic acid)-ethylene diamide, 39.8 parts of bis-(2-aminobenzene sulphonic acid)-α.β-dimethyl ethylene diamide, 38.4 parts of bis-(2-aminobenzene sulphonic acid)-α-methyl ethylene diamide, 39.8 parts of bis-(2-aminobenzene sulphonic acid)-α.α-dimethyl ethylene diamide, 41.8 parts of bis-(2-aminobenzene sulphonic acid)-o-phenylene diamide or 41.2 parts of 1.2-bis-(2'-aminobenzene sulphamido)-cyclohexane are used.

EXAMPLE 3

The non-metal containing disazo dyestuff obtained according to Example 1 in 250 parts of acetamide is warmed to 130–140° with 30 parts of cobalt acetate (corresponding to 7.1 parts of cobalt) until all the original dyestuff has disappeared. The reaction mixture is poured on to sodium chloride solution and the precipitated dyestuff is filtered off. It dyes wool from a weakly acid bath in olive green shades.

EXAMPLE 4

40.5 parts of α-(2-aminobenzene sulphonic acid)-β-(2-amino-4-chlorobenzene sulphonic acid)-ethylene diamide are tetrazotised as described in Example 1 and a solution of 36.6 parts of 1-phenyl-3-methyl-5-pyrazolone in 100 parts of glacial acetic acid is added. The excess hydrochloric acid is neutralised with 56 parts of sodium acetate and on completion of the coupling, the yellow dyestuff is filtered off. The well washed disazo dyestuff is pasted in 750 parts of ethylene glycol, 12 parts of sodium hydroxide and 32 parts of chromic acetate (corresponding to 9.1 parts of $Cr_2O_3$) are added and the whole is heated at 125–135° while stirring until the metallisation process is complete. The yellow solution is poured into a sodium chloride solution and the precipitated dyestuff is filtered off. It is a yellow powder which dyes wool from a weakly acid bath in greenish-yellow shades which have very good fastness to light.

EXAMPLE 5

41.8 parts of bis-(2-aminobenzene sulphonic acid)-o-phenylene diamide are tetrazotised according to Example 1 and a solution of 30.2 parts of β-naphthol in 200 parts of glacial acetic acid is added. 47 parts of sodium acetate are added whereupon the coupling proceeds very quickly. The reaction mixture is stirred for 1 hour at room temperature, the disazo dyestuff is filtered off and thoroughly washed with hot water. The dried dyestuff is pasted in 200 parts of ethylene glycol, 32 parts of chromic acetate (corresponding to 9.1 parts of $Cr_2O_3$) and 13.6 parts of sodium hydroxide are added and the whole is heated for 1 hour at 130–135° while stirring. The chroming mixture is then poured into diluted sodium chloride solution and the brown chromium complex is filtered off. It dyes wool from a weakly acid bath in brown shades which are fast to light.

EXAMPLE 6

44.7 parts of the compound of the formula:

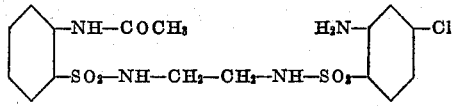

are dissolved hot in 500 parts of glacial acetic acid. First 29 parts of concentrated hydrochloric acid and then 6.9 parts of sodium nitrite (as concentrated aqueous solution) are added at room temperature, the latter addition being made dropwise. 25.3 parts of 1-(3'-sulphamidophenyl)-3-methyl-5-pyrazolone and 28 parts of sodium acetate are then added to the diazonium solution while stirring. The reaction mixture is stirred at room temperature until the coupling is complete and then the yellow monoazo dyestuff is filtered off. It is thoroughly washed with water, dissolved in 500 parts of water with 25 parts of sodium hydroxide and the whole is boiled for 8 hours under reflux. After cooling, 7 parts of sodium nitrite are added and at 15–20° 105 parts of concentrated hydrochloric acid are quickly added. The mixture is left to diazotise completely for two hours, the diazonium compound is filtered off, poured into a solution of 15.1 parts of β-naphthol in 250 parts of glacial acetic acid and then 20 parts of sodium acetate are added. The disazo dyestuff precipitates in the form of orange coloured crystals. It is filtered off, and washed with water. The dried dyestuff is pasted in 500 parts of ethylene glycol, 32 parts of chromic acetate (corresponding to 9.1 parts of $Cr_2O_3$) are added and the mixture is heated at 125–135° until the metallisation process is complete, during which the reaction is kept alkaline to phenolphthalein by the addition of caustic soda lye. The chroming mixture is poured into sodium chloride solution and the precipitated dyestuff is filtered off. It is a brown powder which dyes wool from a weakly acid bath in orange-brown shades which have excellent fastness to light.

The following dyestuffs and the metal containing compounds thereof can be produced according to the information given in the above examples:

| No. | Tetrazo component | Azo component | Metal | Shade |
|---|---|---|---|---|
| 1 | bis-(2-aminobenzene sulphonic acid)-ethylene diamide. | tert. p-amyl phenyl. | Cr | yellowish brown. |
| 2 | ----do---- | 3,4-dimethyl phenol. | Cr | Do. |
| 3 | ----do---- | 5,8-dichloro-1-naphthol. | Cr | violet brown. |
| 4 | ----do---- | carbomethoxyamino-naphthol-1,7. | Cr | Do. |
| 5 | ----do---- | 1-(3'-chlorophenyl)-3-methyl-5-pyrazolone. | Cr | greenish yellow. |
| 6 | bis-(2-amino-4-chloro-benzene-sulphonic acid)-ethylene diamide. | 1-(3'-sulphamidophenyl)-3-methyl-5-pyrazolone. | Cr | Do. |
| 7 | ----do---- | β-naphthol. | Cr | red-brown. |
| 8 | ----do---- | ----do---- | Co | olive green |
| 9 | 1,2-bis-(2'-aminobenzene-sulphamido)-cyclo-hexane. | ----do---- | Cr | red-brown. |
| 10 | ----do---- | 1-(2'-tolyl-5'-methylsulphonyl)3-methyl-5-pyrazolone. | Cr | greenish yellow. |
| 11 | bis-(2-aminobenzene sulphonic acid)-ethylene diamide. | $A_1$ = 2,6-naphthol sulphamide; $A_2$ = 1-phenyl-3-methyl-5-pyrazolone. | Cr | orange-brown. |
| 12 | bis-(2-amino-5-nitro-benzene sulphonic acid)-ethylene diamide. | β-naphthol. | Cr | brown. |
| 13 | bis-(2-amino-4-chloro-benzene sulphonic acid)-ethylene diamide. | 2,6-naphthol sulphamide. | Cr | red-brown. |
| 14 | bis-(2-aminobenzene sulphonic acid)-ethylene diamide. | $A_1$ = 2,6-naphthol sulphonic acid; $A_2$ = β-naphthol. | Cr | Do. |

Following are formulae of the unmetallized dyestuffs corresponding to representative products obtained according to the foregoing table:

No. 5

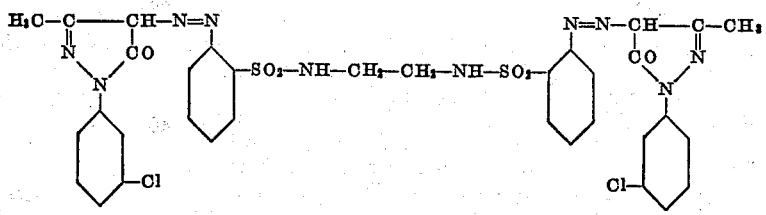

No. 6

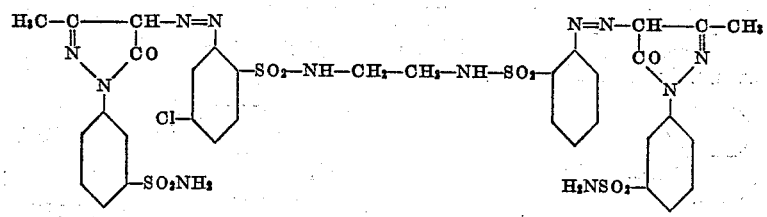

No. 7

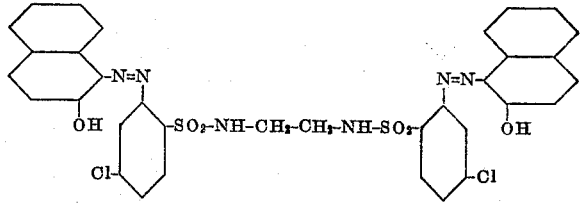

What we claim is:
1. A dyestuff selected from the class consisting of the disazo dyestuffs having the general formula:

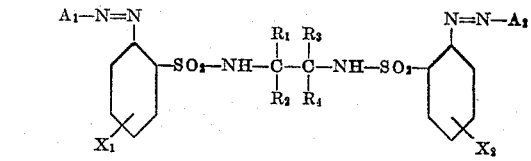

wherein $A_1$ and $A_2$ represent the radical of a member selected from the group consisting of phenolic, naphtholic and enolic coupling components, containing the hydroxyl group in the ortho-position to the azo group, $X_1$ and $X_2$ each represents a member selected from the group consisting of H, Cl and $NO_2$, $R_1$, $R_2$, $R_3$ and $R_4$ represent a member selected from the group consisting of hydrogen and alkyl radicals which may be joined together to form part of a six-membered isocyclic ring system, and the complex chromium and cobalt compounds of said dyestuffs.

2. The complex chromium compound of a disazo dyestuff having the general formula:

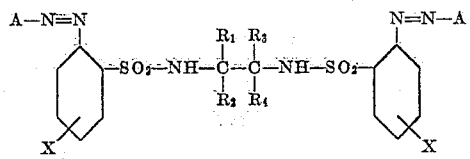

wherein A represents the radical of a member selected from the group consisting of naphtholic and pyrazolonic coupling components containing the hydroxyl group in the ortho position to the azo group, X represents a member selected from the group consisting of H, Cl and $NO_2$, $R_1$, $R_2$, $R_3$ and $R_4$ represent a member selected from the group consisting of hydrogen and alkyl radicals which may be joined together to form part of a six-membered isocyclic ring system, A being free from carboxylic acid and sulphonic acid groups.

3. The complex chromium compound of the disazo dyestuff having the formula:

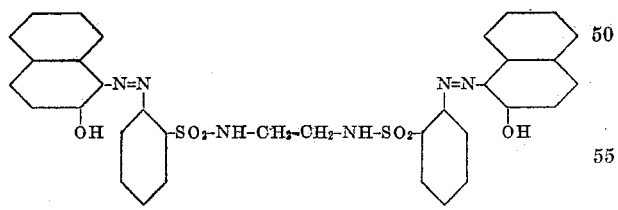

4. The complex chromium compound of the disazo dyestuff having the formula:

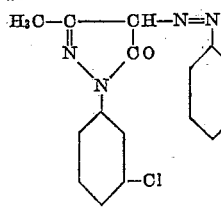
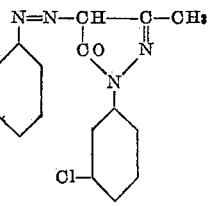

5. The complex chromium compound of the disazo dyestuff having the formula:

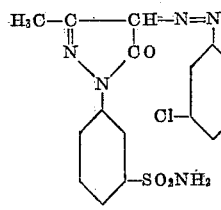
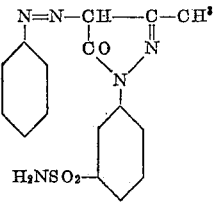

6. The complex chromium compound of the disazo dyestuff having the formula:

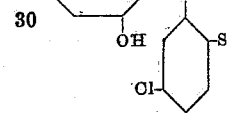
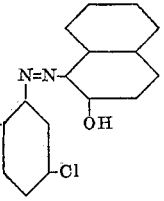

7. The complex chromium compound of the disazo dyestuff having the formula:

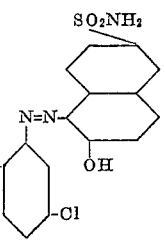

References Cited in the file of this patent

UNITED STATES PATENTS

| | | |
|---|---|---|
| 2,133,787 | Northey | Oct. 18, 1938 |
| 2,164,785 | Rossander | July 4, 1939 |
| 2,438,754 | Krebser et al. | Mar. 30, 1948 |
| 2,448,853 | Allen et al. | Sept. 7, 1948 |